R. L. MORGAN.
CHUCK.
APPLICATION FILED MAY 9, 1918.

1,364,783.

Patented Jan. 4, 1921.
3 SHEETS—SHEET 1.

Inventor
R. L. Morgan
By Attorney
Geo. H. Kennedy

UNITED STATES PATENT OFFICE.

RALPH L. MORGAN, OF WORCESTER, MASSACHUSETTS, ASSIGNOR TO WORCESTER MACHINE WORKS, OF WORCESTER, MASSACHUSETTS, A CORPORATION OF MASSACHUSETTS.

CHUCK.

1,364,783.   Specification of Letters Patent.   Patented Jan. 4, 1921.

Application filed May 9, 1918. Serial No. 233,440.

*To all whom it may concern:*

Be it known that I, RALPH L. MORGAN, a citizen of the United States, residing at Worcester, in the county of Worcester and Commonwealth of Massachusetts, have invented new and useful Improvements in Chucks, of which the following, together with the accompanying drawings, is a specification.

The present invention relates to improvements in chucks, and more particularly to chucks of the type wherein the piece or work to be operated upon is seized and held by a plurality of coöperating jaws.

The invention resides in the adaptation of electrical or magnetic means for operating all of said jaws simultaneously, whereby the work or piece to be operated upon is subject to a uniform pressure at all points of seizure, and, furthermore, is held in centered position with respect to the axis of the chuck. Other and further objects will be apparent as the description proceeds, reference being had in this connection to the accompanying drawings, wherein—

Like reference characters refer to like parts in all the figures.

Figure 1:
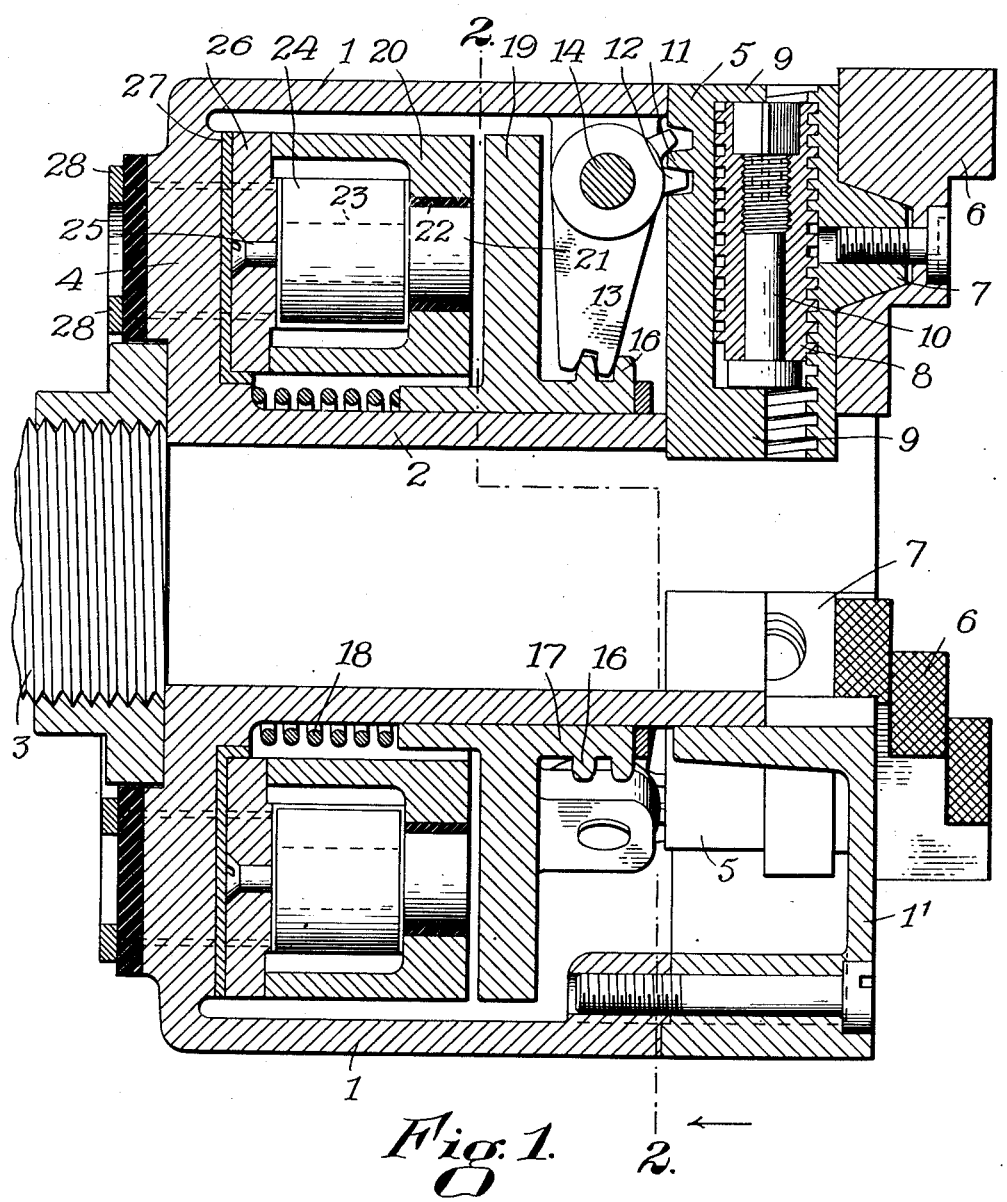
Figure 1 is a central sectional view through a chuck embodying my invention.

I have illustrated my improved chuck in the accompanying drawings as consisting of a body portion or hollow shell 1, which may be cylindrical in form as shown, or may be of any desired shape. The shell 1 has an interior hub portion 2, which may be centrally bored to permit the mounting of the chuck body on a shaft or mandrel 3. One end of the body is closed by a preferably integral end wall 4 extending between the hub 2 and the outer wall of shell 1.

Figure 2:
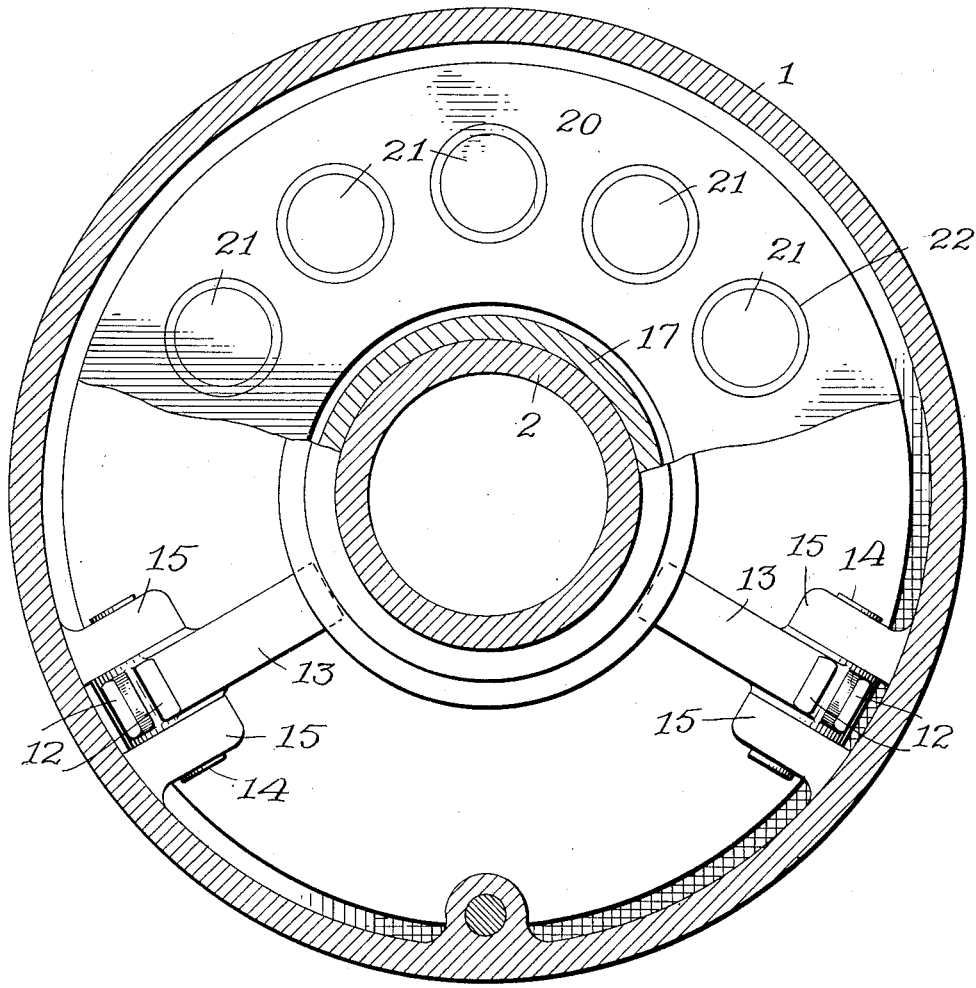
Fig. 2 is a transverse sectional view on the broken line 2—2 of Fig. 1.

At the opposite end of the chuck body, as shown in Figs. 1 and 2, a detachable end portion 1', annular in form, is so formed as to provide radially disposed guideways for a plurality of sliding blocks 5, 5, here shown as three in number, and disposed 120° apart. Each block 5 carries one of the jaws 6 of the chuck, said jaws 6 being of the usual stepped or flanged construction, and adapted to be adjusted longitudinally with respect to the sliding blocks 5, 5. This adjustment of the jaws 6 may be accomplished in any well known manner; as here shown, each jaw is secured to a member 7 having a screw-thread connection with a sleeve 8, which is held against longitudinal movement between end walls 9, 9 of the block 5. The rotation of the sleeve 8 thereby moves the member 7 and jaw 6 out or in as the case may be, and said sleeve 8 is held in any desired position of adjustment by means of the usual bolt 10, coöperating therewith.

On the rear face of each sliding block 5 are provided one or more rack teeth 11, adapted to coöperate with corresponding teeth 12 on the short arm of an elbow lever 13. These elbow levers 13, here shown as three in number, corresponding to the sliding blocks 5, are fulcrumed on pins 14 which are carried by inwardly extending radial lugs 15 on the outer wall of shell 1. The longer arms of the levers 13 have toothed ends which engage with teeth 16 on a sleeve or hub 17, the latter being mounted for sliding movement on the hub 2 of shell 1. If desired, a spring 18 may be interposed between the sleeve 17 and the end wall 4 of the shell, said spring exerting its force to press the sleeve 17 outwardly, and thereby, through the levers 13 and associated parts, serving to hold the jaws 6 in a distended or open position.

The sleeves 17 provide an outwardly extending annular flange 19, located at the rear of the levers 13, and this flange constitutes a means for drawing the sleeve rearwardly, against the force of spring 18, to move the jaws 6 inwardly into operative position against the work. To this end said flange 19 is made subject to the pull of a magnetic chuck, which is located within the shell 1. As here shown, said magnetic chuck has a holding face 20 disposed in operative relation to the flange 19, and providing a plurality of pole pieces 21, which are insulated from the metal of the face by surrounding them with non-magnetic material, indicated at 22. Each pole piece 21 is extended to form a core 23, and the cores of adjacent pole pieces are surrounded with oppositely wound coils 24, whereby to impart opposite polarity to their respective pole pieces 21. Each core 23 is held in place by a screw or bolt 25 passing through the detachable annular back plate 26 of the chuck, the latter being separated from the end wall of shell 1 by a suitable layer of non-magnetic material such as a brass plate 27. The pole pieces 21 are energized in the usual manner by passing an electric current through their oppositely wound coils, as by means of the usual collector rings 28, 28 disposed in any suitable position exteriorly of the body 1. When said pole pieces 21 are energized, the flange 19 is attracted toward them magnetically, and the force of the attraction is greatly multiplied by the levers 13, to draw the jaws 6 inwardly in unison to clamp the work in position.

Figure 3:
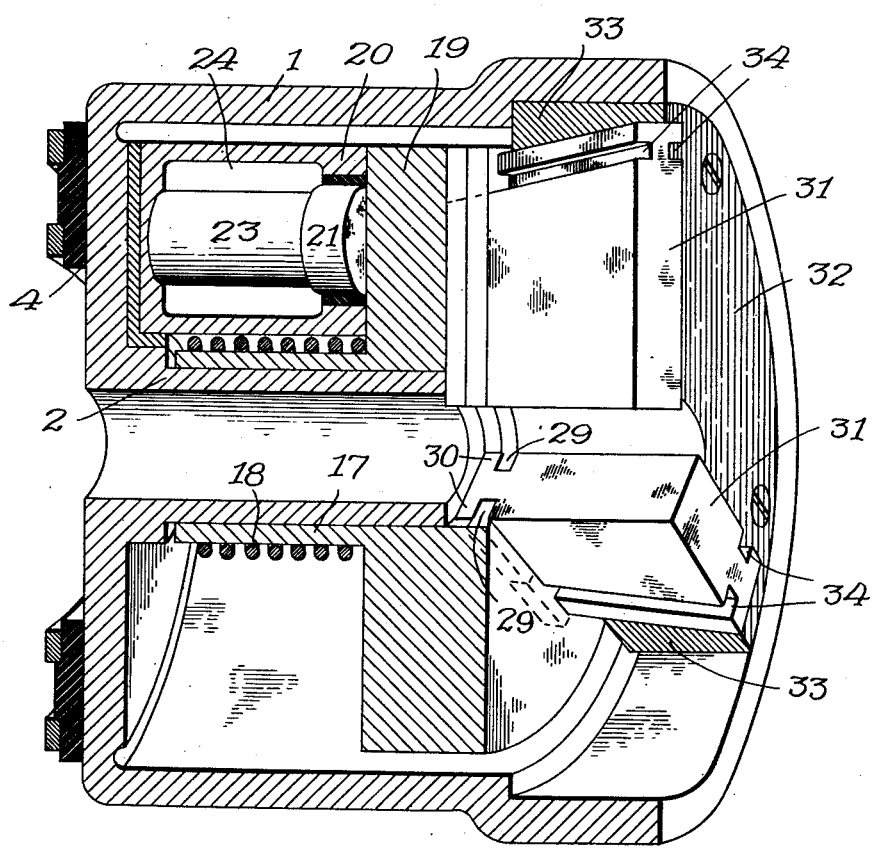
Fig. 3 is a sectional view, in perspective, of a modification of my invention.

In the form of device shown in Fig. 3, the levers 13 are omitted, the shell 1 being thus made more compact on account of the direct connection of the sliding jaw carrying blocks to the movable member which is operated upon by the magnetic chuck. The latter may be constructed in substantially the same manner as the magnetic member shown in Figs. 1 and 2, with a holding face 20 and pole pieces 21 having cores 23 and energizing coils 24.

The magnetic member is operative upon the flange 19 of a slidable sleeve 17, constructed to operate in precisely the same fashion as the sleeve 17 of Figs. 1 and 2 and being urged outwardly by a yielding spring 18. The front face of the flange 19 is formed with a plurality of undercut grooves or slideways 29, 29, the latter being radially disposed for coöperation with corresponding tongues 30, 30 along the adjacent edges of three sliding blocks 31. Said blocks correspond in function to the blocks 5, 5 of Figs. 1 and 2, and are extended forwardly through the detachable end portion 32 of shell 1, carrying on their projecting portions the adjustable jaws, not shown, of the chuck.

The edge of each block 31 which is farthest removed from the axis of the chuck, is inclined or oblique with respect to said axis, and said edge coöperates with a corresponding oblique bearing surface or slideway 33, formed or secured on the shell 1. As shown in Fig. 3, interlocking tongue and groove connections 34 are provided between each block 31 and its corresponding inclined bearing surface 33, so that when the flange 19 is drawn rearwardly by the magnetism of the face 20, the three blocks 31, in moving rearwardly with said flange, are also simultaneously forced inwardly, by the wedging action of the surfaces 33. Thus the three movable chuck jaws, not shown, are caused to exert equal pressures on the three points at which the work is held, when the magnetic element is energized. In both forms of the device, the discontinuance of the electric current through the coils 24 releases the work, the springs 18 procuring the outward movement of the respective sliding blocks 5 and 31.

I claim:

1. In a chuck, the combination with a body portion, a set of work engaging jaws carried thereby, all of said jaws being movable radially toward and from the center of said body portion and a cylindrical sleeve slidably mounted for longitudinal movement on said body portion for operating said jaws, of magnetic means surrounding said sleeve for exerting an equally distributed pull thereon to operate said jaws.

2. In a chuck, the combination with a body portion, a set of work engaging jaws carried thereby, all of said jaws being movable radially toward and from the center of said body portion and a cylindrical sleeve slidably mounted for longitudinal movement on said body portion for operating said jaws, of a plurality of pole-pieces surrounding said sleeve for exerting an equally distributed magnetic pull thereon to operate said jaws.

3. In a chuck, the combination with a body portion, a set of work engaging jaws carried thereby, all of said jaws being movable radially toward and from the center of said body portion and a cylindrical sleeve slidably mounted for longitudinal movement on said body portion for operating said jaws, the said sleeve being provided with an upwardly extending annular flange, of magnetic means for exerting an equally distributed pull on said flange to operate said jaws.

4. In a chuck, the combination with a body portion, a set of work engaging jaws carried thereby, all of said jaws being movable radially toward and from the center of said body portion and a cylindrical sleeve slidably mounted for longitudinal movement on said body portion for operating said jaws, the said sleeve being provided with an upwardly extending annular flange, of a plurality of pole pieces surrounding said sleeve and having their holding faces substantially parallel to said flange for exerting an equally distributed pull thereon to operate said jaws.

RALPH L. MORGAN.

Witnesses:
NELLIE WHALEN,
PENELOPE COMBERBACH.